United States Patent [19]

Harris et al.

[11] Patent Number: 5,664,802
[45] Date of Patent: Sep. 9, 1997

[54] ADJUSTABLE PERFORMANCE HYBRID INFLATOR

[75] Inventors: Bradley D. Harris, Farmington, Utah; Ian Faye, Stuttgart, Germany

[73] Assignees: Morton International, Inc., Chicago, Ill.; Robert Bosch GmbH, Stuttgart-Feuerbach, Germany

[21] Appl. No.: 601,946

[22] Filed: Feb. 15, 1996

[51] Int. Cl.$^6$ ................................................. B60R 21/26
[52] U.S. Cl. ........................... 280/736; 280/741; 280/737
[58] Field of Search ................................ 280/736, 737, 280/741; 222/3–5; 422/164–166

[56] References Cited

U.S. PATENT DOCUMENTS

| | | | |
|---|---|---|---|
| 3,784,223 | 1/1974 | Hass et al. | 280/150 AB |
| 3,786,843 | 1/1974 | Stephenson et al. | 141/13 |
| 3,884,497 | 5/1975 | Massengill et al. | 280/150 AB |
| 3,915,339 | 10/1975 | Matson | 222/3 |
| 3,951,427 | 4/1976 | Wilfert | 280/732 |
| 4,050,483 | 9/1977 | Bishop | 141/4 |
| 4,948,168 | 8/1990 | Adomeit et al. | 280/732 |
| 5,016,914 | 5/1991 | Faigle et al. | 280/741 |
| 5,060,974 | 10/1991 | Hamilton et al. | 280/736 |
| 5,078,422 | 1/1992 | Hamilton et al. | 280/736 |
| 5,230,531 | 7/1993 | Hamilton et al. | 280/737 |
| 5,330,226 | 7/1994 | Gentry et al. | 280/736 X |
| 5,345,876 | 9/1994 | Rose et al. | 102/531 |
| 5,351,988 | 10/1994 | Bishop et al. | 280/737 |
| 5,400,487 | 3/1995 | Gioutsos et al. | 280/735 |
| 5,413,378 | 5/1995 | Steffens, Jr. et al. | 280/735 |
| 5,439,249 | 8/1995 | Steffens, Jr. et al. | 280/735 |

FOREIGN PATENT DOCUMENTS 3824469  1/1990  Germany .............................. 280/736

*Primary Examiner*—Christopher P. Ellis
*Attorney, Agent, or Firm*—George W. Rauchfuss, Jr.

[57] ABSTRACT

A hybrid inflator includes a pressure bottle containing compressed gas, combustible propellant for augmenting the stored gas and defining an outlet for delivering inflation gas from the inflator to a primary airbag cushion. The hybrid inflator further includes a vent opening defined as a second outlet from the pressure bottle for releasing stored compressed gas therefrom and a rupturable diaphragm positioned to seal the vent and prevent premature flow from the vent opening. A controller provides a signal for operating a squib for opening the primary outlet means and igniting the combustible propellant, and another signal for operating a squib rupturing the diaphragm covering the vent opening. The vent opening may be opened first to vent gas from the pressure bottle in advance of opening the primary outlet, may be opened with or after the primary outlet, or not at all. The vented gas is variously used for a soft onset of inflation of the primary airbag cushion, for inflation of an additional airbag cushion including a knee bolster, or the gas is dispersed.

24 Claims, 2 Drawing Sheets

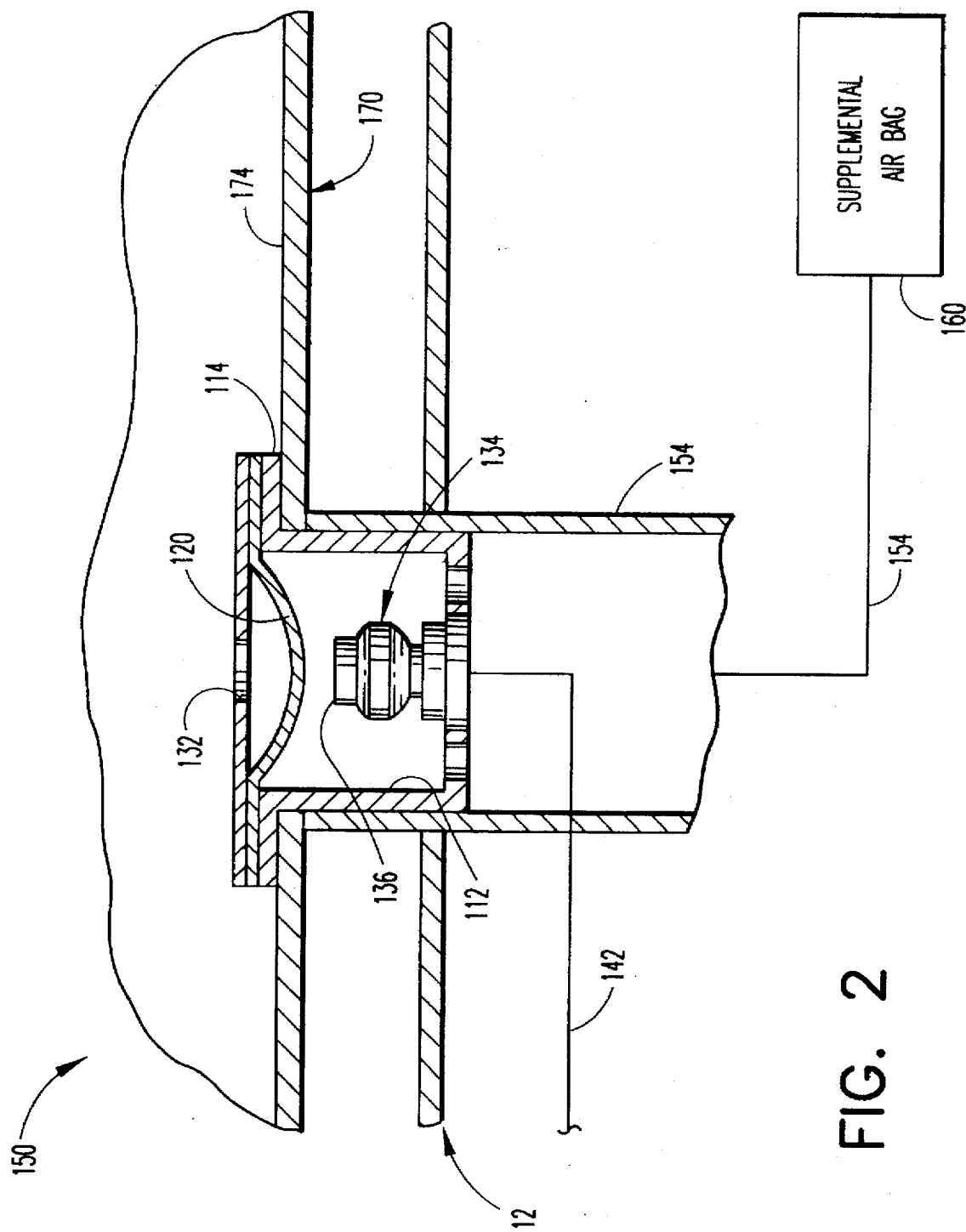

ADJUSTABLE PERFORMANCE HYBRID INFLATOR

FIELD OF THE INVENTION

The invention herein relates to a hybrid inflator for a vehicle occupant restraint system, and more particularly to a hybrid inflator with performance adjustable by provision of a secondary gas outlet. The invention further relates to a hybrid inflator wherein a portion of the inflator flow is optionally delivered to a supplemental airbag cushion.

BACKGROUND OF THE INVENTION

Modern cars are equipped with air cushion restraint systems which deploy to protect occupants in the event of a vehicle crash. A driver's side restraint system includes an airbag which deploys from the steering wheel hub, and the passenger's side restraint system includes a larger airbag which deploys from the dashboard of the vehicle. Both the driver's side and passenger's side airbag cushion restraint systems often include hybrid inflators for providing inflation gasses to the airbag. The hybrid inflators include a compressed gas and a combustible material which provides heat and additional inflation gas augmenting the volume and pressure of the stored compressed gas.

The performance of the airbag occupant restraint systems, and particularly the larger size passenger's side airbag, is preferably optimized as a function of variables associated with each particular crash. These variables include the severity of the crash and also include the size and position of the passenger as well as temperature conditions that may affect the performance of the inflator. For instance, the least aggressive deployment of the airbag is appropriate for a low speed crash with an out-of-position, small occupant, wherein the most aggressive deployment of the airbag may be appropriate for a head on high-speed crash with a large adult passenger. The inflation of the bag is, of course, in large part controlled by the operation of the inflator.

Previous efforts at adjusting the performance of a hybrid inflator have centered about operating the hybrid inflator in stages through its primary gas delivery outlet. For instance, in some instances a variable time delay between release of the compressed gas and ignition of the combustible material for augmenting the pressurized gas has been provided. In other instances, the combustible material has been provided in multiple or staged combustible units, with means for controlling the number of stages operated in a particular crash. An airbag restraint system has also been provided with a diffuser which vents a portion of the gas away from the airbag, after the gas has been released through the vent outlet.

Modern vehicles are increasingly being equipped with additional auxiliary airbag systems, such as knee bolsters and side impact airbags. Discreet inflators are usually provided for each of these systems. These additional restraint systems are generally inflated before the large passenger side airbag, in that the distance between the occupant's knees and the knee bolster or the distance between the occupant's shoulders and the side of the vehicle are small, necessitating a fast response. It would be advantageous if a single inflator could be adapted to provide inflation for the primary airbag cushion and to one or more additional airbag cushions as well.

SUMMARY OF THE INVENTION

Accordingly, it is a principal object of the invention herein to provide a hybrid inflator with adjustable performance.

It is also a principal object of the invention herein to adapt an inflator for inflating a primary airbag and an additional airbag.

In accomplishing these and other objects of the invention herein, there is provided a hybrid inflator of the type having a pressure bottle storing a compressed gas, combustible means for heating the stored gas and primary outlet means for delivering inflation gas to a primary airbag. The inflator is improved by providing a vent opening defined as a secondary outlet from the pressure bottle storing the compressed gas, the vent opening sealed by a diaphragm, and means for rupturing the diaphragm to vent gas from the pressure bottle in response to a control signal independent of the operation of the hybrid inflator in providing inflation gas through the primary outlet. The performance of the inflator in providing inflator gas to the primary airbag is adjusted by venting compressed gas from pressure bottle.

According to certain aspects of the invention, the vent opening permits gas to disperse, directs gas to the primary airbag prior to primary operation of the inflator, or is connected to an additional airbag cushion. The additional airbag is a knee bolster or side impact airbag.

According to further aspects of the invention herein, a vehicle occupant restraint system includes a crash sensor and means for producing first and second control signals as a function of crash parameters. A pressure bottle stores compressed gas and combustible means are mounted to the pressure bottle, upon ignition thereof in response to one of the control signals, ignites to augment inflation gas provided to the primary airbag cushion. The pressure bottle defines a primary outlet opening for delivering inflation gas to a primary airbag cushion and means for opening the primary outlet and igniting the combustible material in response to the first control signal. The pressure bottle further defines a vent outlet covered by a rupturable diaphragm to maintain the compressed gas within the pressure bottle, and means for rupturing the diaphragm in response to the other control signal.

According to other aspects of the invention, the vent opening is sealed by a burst disk which is opened by a squib. Additionally, the vent opening is defined by an outlet plate offset from the burst disk, and the vent opening is positioned transverse to and spaced from the flow of gas and products of combustion in the pressure bottle. According to still further aspects of the invention, the vent outlet opening defined by the pressure bottle is vented from the airbag restraint system, is supplied to the primary airbag before opening of the primary outlet, or is connected to an additional airbag. The additional airbag is a knee bolster or side impact airbag.

The various features of novelty which characterize the invention are pointed out with particularity in the claims annexed to and forming part of this specification. For a fuller understanding of the invention, its operating advantages and the specific objects attained by its use, reference is made to the accompanying drawings and descriptive matter in which the preferred embodiments are illustrated.

DRAWINGS

FIG. 1 is a longitudinal sectional view of an inflator according to the invention herein, included in a schematically illustrated airbag restraint system; and FIG. 2 is an enlarged fragmentary schematic view of another airbag restraint system according to the invention herein.

The same reference numerals refer to the same elements throughout the various drawings.

DESCRIPTION OF PREFERRED EMBODIMENTS

Figure 1:
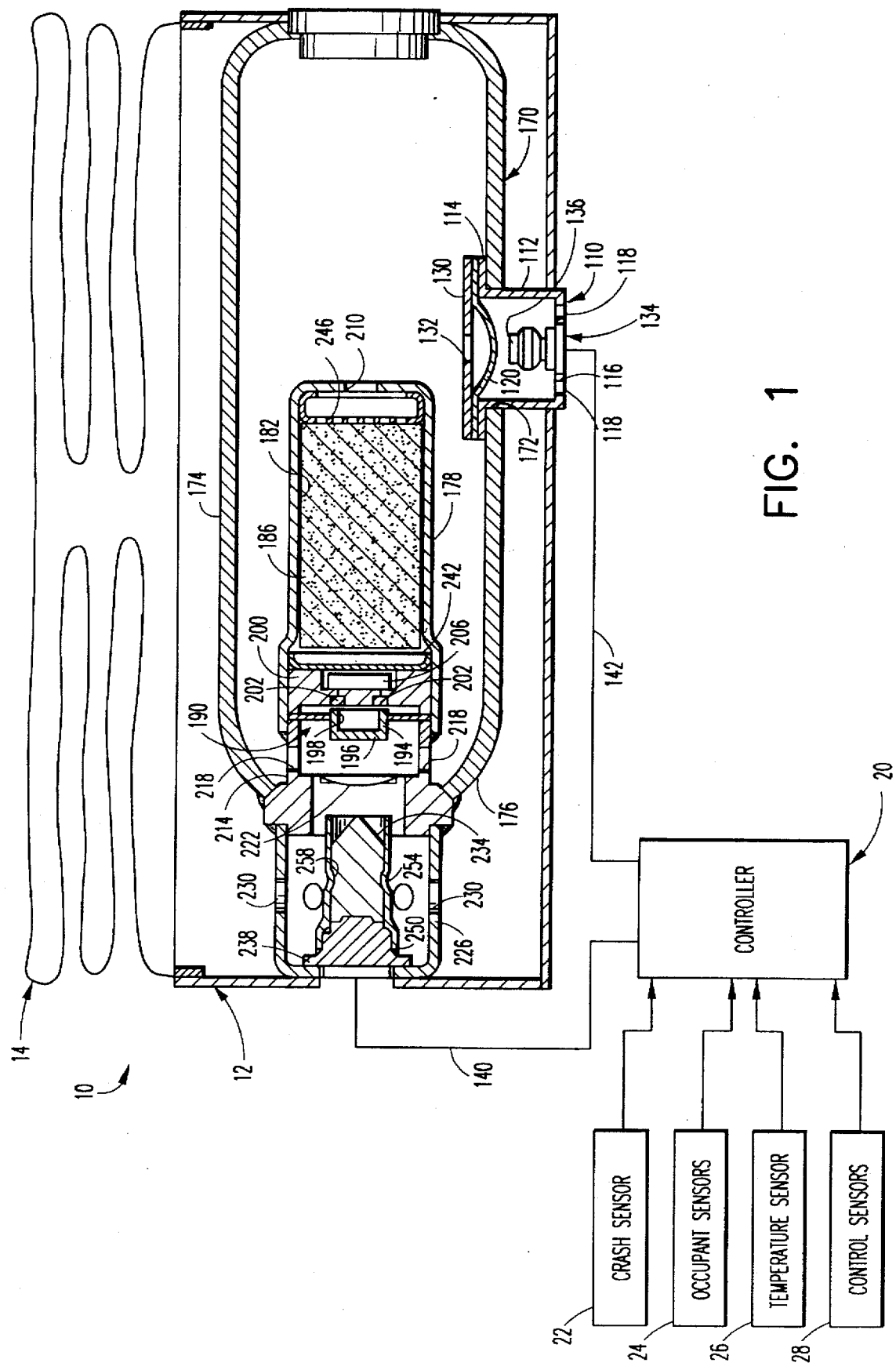

With reference to FIG. 1, an airbag restraint system 10 according to the invention herein includes an adjustable performance hybrid inflator 170 mounted in a reaction canister 12 for inflating a primary airbag 14. The adjustable performance hybrid inflator 170 is characterized by a vent assembly 110 which provides the feature of adjustable performance. A controller 20 operates the adjustable performance hybrid inflator 170, including the vent assembly 110, based upon input from one or more sensors 22, 24, 26 and 28.

The hybrid inflator 170 generally includes a pressure bottle 174 which contains compressed gas. The compressed gas is preferably argon and is maintained at a pressure ranging from 2,100 psi to 3,900 psi, in part depending upon the ambient temperature. The stored gas is retained within the pressure bottle 174 by a closure disk 222. More particularly, the closure disk 222 is positioned within a disk housing 214 which is attached to the discharge end 176 of the pressure bottle 174. A plurality of disk housing outlets 218 are defined through the disk housing 214 to allow the gas within the pressure bottle 174 to communicate with the interior of the disk housing 214 and thus exert a force on the closure disk 222 prior to operation of the inflator 170.

The hybrid inflator 170 further comprises a gas generator 178 having a propellant 186 contained therein. The gas generator 178 is connected to the disk housing 214 and extends into the elongated pressure bottle 174. The gas generator 178 further includes an ignition assembly 190 positioned adjacent to the disk housing 214, and a propellant chamber 182 which contains the propellant 186 adjacent the ignition assembly 190.

The ignition assembly 190 includes an activation plate 194 and a charge holder 200 in which an ignition charge 206 is contained. Primers 202 are positioned between impact members 198 extending from the top surface 196 of the activation plate 194 and the charge holder 200. A perforated retainer 242 is provided between the ignition assembly 190 and the gas generant 186. A propellant strainer 246 is positioned at the other end of the propellant chamber 182, and an outlet 210 is defined in the end of the propellant chamber.

The inflator 170 further comprises a diffuser cap 226 which mounts a squib 238 and a projectile 234 in a sleeve 250 extending from the squib 238 toward the burst disk 222 and activation plate 194. The sleeve 250 is crimped at 254 and the projectile 234 is notched at 258, to retain the projectile prior to firing the squib 238. The diffuser cap 226 defines a plurality of outlet openings 230 comprising the primary outlet of the inflator 170. Inflation gas exiting the outlets 230 is directed by the reaction canister 12 to inflate the primary airbag 14, as is well known in the art.

When the squib 238 is fired, the projectile 234 is propelled through the burst disk 222, permitting a flow of compressed gas from the inflator 170. The projectile 234 strikes the top surface 196 of activation plate 194, operating primers 222 and the ignition charge 206 to ignite the propellant 186. The gases generated by the combustion of the propellant 186 flow through the gas generator outlet 210 toward the end of the pressure bottle 174 and augment the inflation gas delivered from the pressure bottle.

The inflator 170 is characterized by a vent assembly 110 which provides for adjustable performance of the inflator. The vent assembly 110 comprises a tubular sleeve 112 extending through opening 172 in the pressure bottle 174. Flange 114 extends outwardly from one end of sleeve 112, the flange 114 being shaped to conform to the interior of the pressure bottle 174 surrounding an opening 172 defined therein extending through the opening 172. The flange 114 mounts a rupturable diaphragm 120 extending across the sleeve 112 to seal the pressure bottle 174. The periphery of the diaphragm 120 is sealingly secured to the flange 114 and sleeve 112 is sealingly secured in opening 172. A vent plate 130 is also secured to the flange 114 and extends across the end of the sleeve 112. The vent plate 130 defines a vent opening 132 sized to control release of gas from the pressure bottle 174 upon rupture of the diaphragm 120. The vent opening 132 is position spaced from and transverse to the output of gas generator 178, to minimize venting hot particles of combustion. A filter may be placed over the vent opening for that purpose, as well.

The vent assembly 110 further includes a squib 134 mounted in an end wall 116 of the sleeve 112. The squib 134 has explosive material contained within a cover 136 positioned closely adjacent the diaphragm 120 for rupturing the diaphragm. The end wall 116 includes a plurality of openings 118 for exhausting gas released from the pressure bottle 174 through the vent opening 132. In the embodiment shown, the released gas is dispersed outside the reaction canister 12; however, it is also contemplated that the gas may be received in the reaction canister 12 for providing an early, soft onset of airbag deployment when squib 136 operates first.

The squib 238 and the squib 134 are operated by electrical control signals delivered over lines 140 and 142, respectively, from the controller 20.

The controller 20 operates the squibs 238 and 134 to adjust the performance of the hybrid inflator 170. To that end, the controller 20 is provided with a plurality of input signals reflecting parameters existing at the time of operation of the inflator. These input signals include a signal from crash sensor 22 indicating a crash condition. Occupant sensors 24 provide information concerning the occupant of the vehicle, to be protected by the airbag restraint system 10, including such information as whether an occupant is present, and may also include the weight and position of the occupant, the latter information derived from plurality of sensors in the seats and seat belt assemblies. A temperature sensor 26 monitors the ambient temperature, which is related to the actual pressure of the gas in the pressure bottle 174. The control sensors 28 detect a variety of other useful parameters, such as the speed of the vehicle, the severity of the crash as measured by deceleration of the vehicle, the direction of the crash, and any other desired information.

The controller 20 is programmed to operate the adjustable performance inflator 170 in the optimal manner, based on the input signals and its programming. For instance, if the ambient temperature is high, whereby the pressure of the gas in pressure bottle 174 is correspondingly high, squib 134 may be operated to vent excess pressure from the pressure bottle 174. Similarly, if the crash is at low speed, if the occupants are of light weight or if other parameters so indicate, the controller can operate the squib 134 to vent gas from the pressure bottle 174 rather than through the primary outlet into the airbag 14. It will be appreciated that the mass of gas in bottle 174 at the time the propellant 186 is burned has an effect on the performance of the propellant, providing additional opportunity for control of performance of the inflator. The controller can operate squib 134 in advance of, simultaneously with, or after operation of squib 238, as desired for the particular parameters of the crash. In some instances, the vent may not be opened at all.

With reference to FIG. 2, another airbag restraint system 150 according to the invention is shown in a schematic, fragmentary view. The airbag restraint system 150 is similar to the airbag restraint system 10 described above, i.e., it includes an adjustable performance hybrid inflator 170 mounted in a reaction can 12 for inflating a primary airbag. The inflator 170 is characterized by the vent assembly 110 in pressure bottle 174, and a controller operates the squib 134 of the vent assembly 110 to deliver inflation gases through the vent opening 130 via a signal provided on line 142. The controller, of course, also operates the other squib of the hybrid inflator 170, for delivering inflation gas to the primary airbag.

The airbag restraint system 150 is further characterized in that the gas exiting the inflator 170 through the vent assembly 110 is delivered via conduit 154 to inflate an additional airbag 160. The additional airbag 160 may be a knee bolster, a side impact airbag, or the like. The controller operates the squibs to optimize performance of the inflator in deploying both the primary and additional airbags, the parameters depending on the particular installation, the particular type of additional airbag, and the various parameters associated with a particular crash condition. It will be appreciated that the inflator 170 is provided with sufficient capacity to inflate the primary and additional airbags, and that the overall cost and complexity of inflating more than one airbag is reduced through the use of a single inflator.

Accordingly, preferred embodiments of airbag restraint systems and an adjustable performance hybrid inflator have been described which admirably achieve the objects of the invention herein. With reference to the description of the preferred embodiments, those skilled in the art will appreciate that modifications may be made without departing from the spirit of the invention. Therefore it is not intended that the scope of the invention be limited to the specific embodiments illustrated and described. Rather it is intended that the scope of the invention be determined by the appended claims and equivalents thereof.

We claim:

1. An improved hybrid inflator of the type having a pressure bottle containing compressed gas, combustible means for augmenting the stored gas and outlet means for delivering inflation gas from the inflator to a primary airbag cushion, the improvement comprising a vent opening defined as a second outlet from the pressure bottle for releasing stored compressed gas therefrom, a rupturable diaphragm positioned to seal the vent opening and prevent premature flow through the vent opening, and a means for rupturing the diaphragm to deliver stored gas from the vent opening in response to a control signal.

2. An improved hybrid inflator as defined in claim 1 wherein the pressure bottle is elongated and the vent opening is formed in the sidewall of the pressure bottle.

3. An improved hybrid inflator as defined in claim 2 and further comprising a gas generator incorporating the combustible means for augmenting the stored gas, the gas generator being contained within the pressure bottle and having an outlet directing the products of combustion toward the end of the pressure bottle.

4. An improved hybrid inflator as defined in claim 3 wherein the means for rupturing the diaphragm sealing the vent opening is a squib positioned adjacent the diaphragm.

5. An improved hybrid inflator as defined in claim 4 wherein the squib is outside the pressure bottle.

6. An improved hybrid inflator as defined in claim 5 and further comprising a vent plate extending across the rupturable diaphragm, the vent plate defining the vent opening, the vent plate extending across a larger pressure bottle opening defined in the pressure bottle and sealed by the rupturable diaphragm.

7. An improved hybrid inflator as defined in claim 6 wherein the rupturable diaphragm and vent plate are mounted to a sleeve extending through the pressure bottle opening and the pressure bottle opening is defined in the sidewall of the pressure bottle.

8. An improved hybrid inflator as defined in claim 7 wherein the sleeve has a radially extending flange received by the pressure bottle surrounding the pressure bottle opening defined therethrough.

9. An improved hybrid inflator as defined in claim 1 wherein the means for rupturing the diaphragm sealing the vent opening is a squib positioned adjacent the diaphragm.

10. An improved hybrid inflator as defined in claim 9 wherein the squib is outside the pressure bottle.

11. An improved hybrid inflator as defined in claim 1 and further comprising a vent plate extending across the rupturable diaphragm, the vent plate defining the vent opening, the vent plate extending across a larger pressure bottle opening defined in the pressure bottle and sealed by the rupturable diaphragm.

12. An improved hybrid inflator as defined in claim 11 wherein the rupturable diaphragm and vent plate are mounted to a sleeve extending through the pressure bottle opening and the pressure bottle opening is defined in the sidewall of the pressure bottle.

13. An improved hybrid inflator as defined in claim 2 wherein the sleeve has a radially extending flange received by the pressure bottle surrounding the opening defined therethrough.

14. An improved hybrid inflator as defined in claim 1 and further comprising a conduit deployed to receive gas from the vent opening and conduct gas received from the vent opening away from the pressure bottle.

15. A vehicle occupant restraint system comprising:
A) means providing first and second control signals in response to a vehicle crash;
B) a hybrid inflator having
   1) a pressure bottle storing compressed gas and combustible means for augmenting the pressure of the compressed gas,
   2) a primary outlet from the pressure bottle for delivering inflation gas,
   3) means responsive to the first control signal for opening the primary outlet and initiating combustion of the combustible means for augmenting the pressure of the compressed gas,
   4) a vent opening defined by the pressure bottle and covered by a rupturable diaphragm, and
   5) means for rupturing the diaphragm in response to the second control signal to release gas through the vent opening;
C) a primary airbag cushion and means for delivering inflation gas from the primary outlet of the pressure bottle to inflate the primary airbag cushion.

16. A vehicle occupant restraint system as defined in claim 15 wherein the means for delivering inflation gas from the primary outlet of the pressure bottle to inflate the primary airbag cushion comprises a reaction canister in which the inflator is mounted and to which the primary airbag cushion is secured.

17. A vehicle occupant restraint system as defined in claim 16 wherein the inflator and reaction canister are adapted to disperse gas released from the vent opening outside the reaction canister.

18. A vehicle occupant restraint system as defined in claim 16 wherein the inflator and reaction canister are adapted to receive gas released through the vent opening for delivery to the primary airbag cushion.

19. A vehicle occupant restraint system as defined in claim 15 and further comprising:
   D) means for delivering gas released through the vent opening to an additional airbag cushion.

20. A vehicle occupant restraint system as defined in claim 19 wherein the additional airbag cushion is a knee bolster.

21. A vehicle occupant restraint system comprising:
   A) controller means for providing first and second control signals in response to parameters of a vehicle crash, and sensors for sensing parameters of the vehicle crash connected as inputs to the controller means;
   B) an inflator, the inflator having
      1) an elongated pressure bottle storing compressed gas containing combustible means for augmenting the pressure of the compressed gas,
      2) a primary outlet defined by the pressure bottle for delivering inflation gas,
      3) means responsive to the first control signal for opening the primary outlet and igniting the combustible means to augment the pressure of the compressed gas,
      4) an opening defined in the pressure bottle and sealingly covered by a diaphragm,
      5) a vent plate mounted extending across the opening in the pressure bottle adjacent the diaphragm, the vent plate defining a vent opening for controlling release of gas from the pressure bottle, and
      6) squib means positioned adjacent the diaphragm for rupturing the diaphragm in response to a second control signal to release gas through the vent opening,
   C) a reaction canister mounting the inflator therein; and
   D) a primary airbag cushion mounted to the reaction canister for receiving inflation gas from the primary outlet of the pressure bottle for inflating the primary airbag cushion.

22. A vehicle occupant restraint system as defined in claim 21 wherein the inflator and reaction canister are adapted to disperse gas released from the vent opening outside the reaction canister.

23. A vehicle occupant restraint system as defined in claim 21 wherein the inflator and reaction canister are adapted to receive gas released through the vent opening for delivery to the primary airbag cushion.

24. A vehicle occupant restraint system as defined in claim 21 and further comprising:
   E) means for delivering gas released through the vent opening to an additional airbag cushion.

* * * * *